(12) United States Patent
Tateno

(10) Patent No.: US 9,924,737 B2
(45) Date of Patent: Mar. 27, 2018

(54) ADJUSTABLE ROTATING BLADE ASSEMBLY FOOD PREPARATION DEVICE

(71) Applicant: Chikara R. Tateno, Santa Cruz, CA (US)

(72) Inventor: Chikara R. Tateno, Santa Cruz, CA (US)

( * ) Notice: Subject to any disclaimer, the term of this patent is extended or adjusted under 35 U.S.C. 154(b) by 190 days.

(21) Appl. No.: 13/999,210

(22) Filed: Jan. 30, 2014

(65) Prior Publication Data

US 2014/0150675 A1    Jun. 5, 2014

Related U.S. Application Data

(63) Continuation-in-part of application No. 12/589,683, filed on Oct. 27, 2009, now Pat. No. 8,695,492, and a continuation-in-part of application No. 13/261,174, filed on Feb. 9, 2012, now Pat. No. 8,875,624.

(51) Int. Cl.
| | |
|---|---|
| *A47J 17/02* | (2006.01) |
| *A23N 7/08* | (2006.01) |
| *B26D 3/26* | (2006.01) |
| *B26D 1/553* | (2006.01) |
| *B26D 3/24* | (2006.01) |

(52) U.S. Cl.
CPC ............. *A23N 7/08* (2013.01); *A47J 17/02* (2013.01); *B26D 1/553* (2013.01); *B26D 3/245* (2013.01); *B26D 3/26* (2013.01)

(58) Field of Classification Search
CPC ......... A47J 17/02; B26D 1/553; B26D 3/245; B26D 3/26; B23N 7/08

USPC ......... 99/540, 541, 545; 30/114, 117, 123.5, 30/302, 303, 155–156, 279.2–279.6, 301; 83/857

See application file for complete search history.

(56) References Cited

U.S. PATENT DOCUMENTS

| | | | | |
|---|---|---|---|---|
| 3,116,770 | A | 4/1964 | Tanuma | |
| 5,533,442 | A * | 7/1996 | Tateno | A47J 17/02 30/114 |
| 5,966,819 | A * | 10/1999 | Coleman | A22C 17/04 30/130 |
| 6,619,194 | B1 | 9/2003 | Kuan | |
| 6,785,970 | B1 * | 9/2004 | Zerlin | B26B 7/00 30/122 |
| 7,055,247 | B2 * | 6/2006 | Kaposi | B26D 3/26 30/114 |
| 7,415,769 | B2 * | 8/2008 | Hughes | A47J 17/02 15/111 |
| 2003/0234205 | A1 * | 12/2003 | McGuyer | A47J 43/28 206/564 |
| 2005/0217122 | A1 * | 10/2005 | Murphy | A47J 17/02 30/279.6 |
| 2007/0227013 | A1 * | 10/2007 | Kaposi | A47J 17/02 30/279.6 |

* cited by examiner

*Primary Examiner* — Reginald L Alexander
(74) *Attorney, Agent, or Firm* — Jeffrey Hall

(57) ABSTRACT

A rotating blade food preparation device (10) for cutting, shaving, slicing, and peeling, vegetables and fruits, cheese, tofu, pizza, meats and other food products, includes a handle (12), a frame element (16) connected to the handle (12), and a rotating blade assembly (28) operably secured to the frame and having dual or multiple functionalities and interchangeability with other rotating blade assemblies.

1 Claim, 10 Drawing Sheets

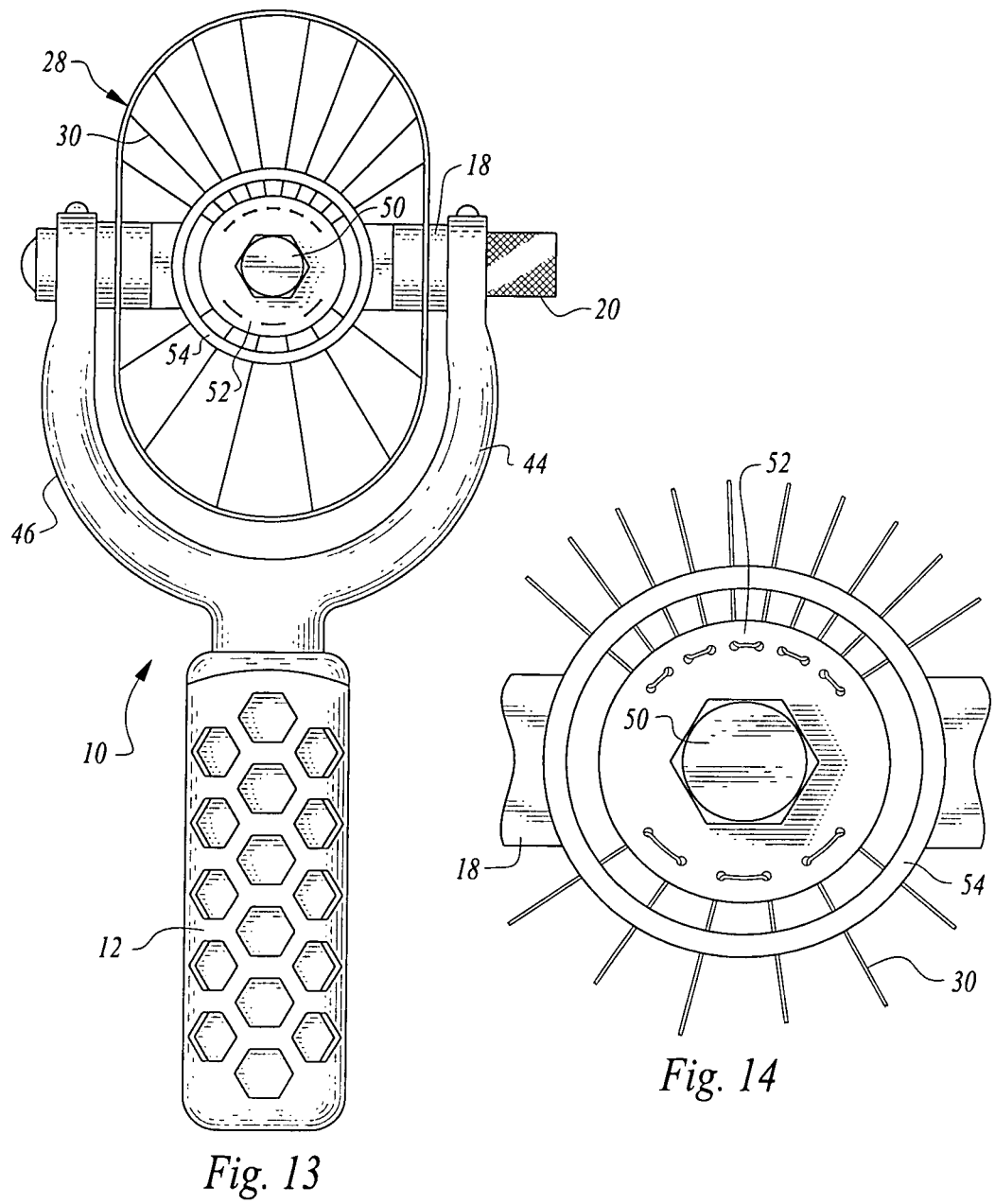
Fig. 13
Fig. 14
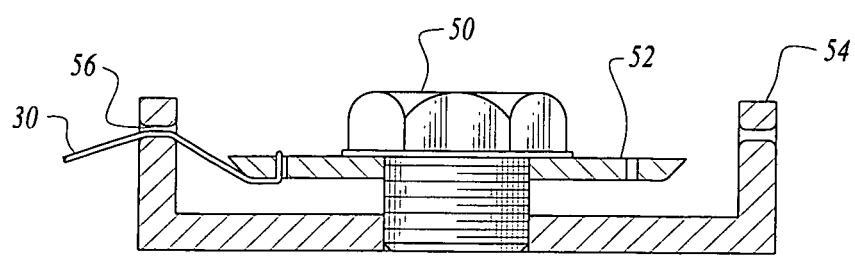
Fig. 15

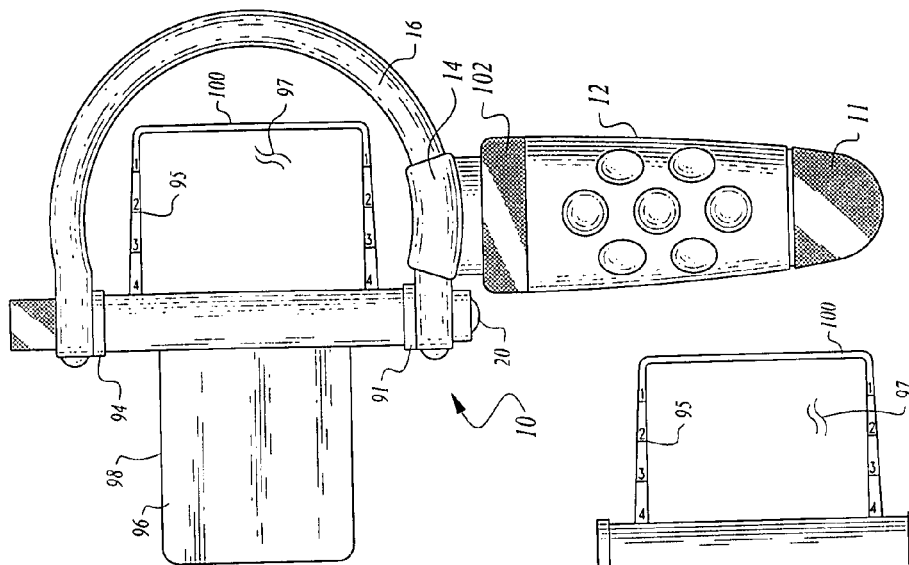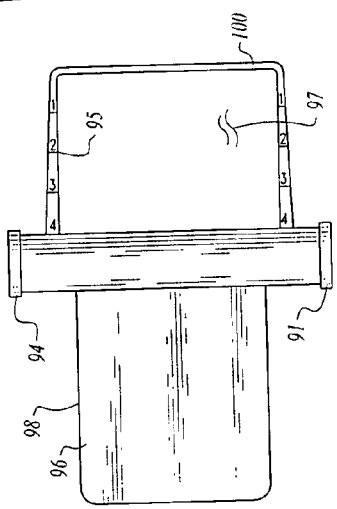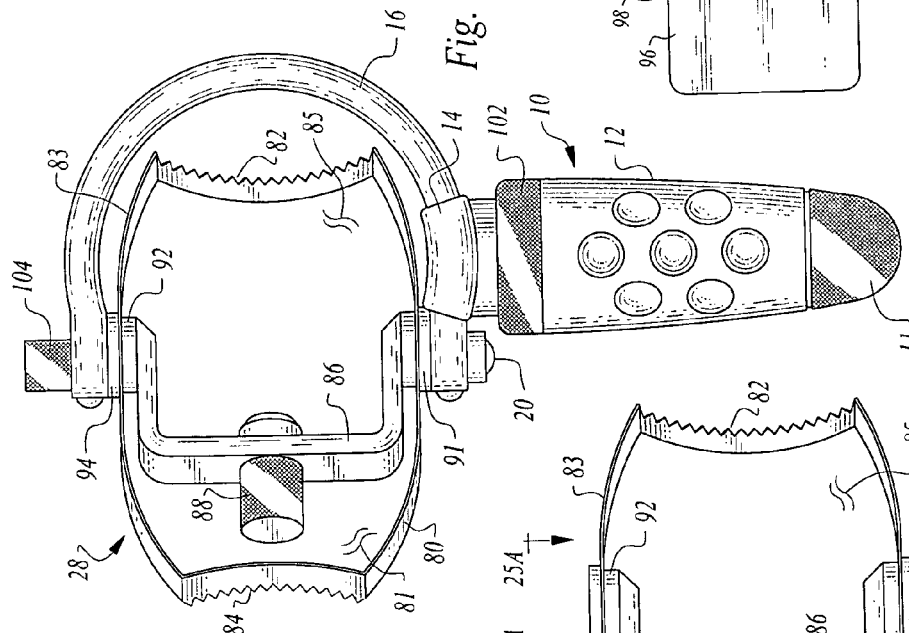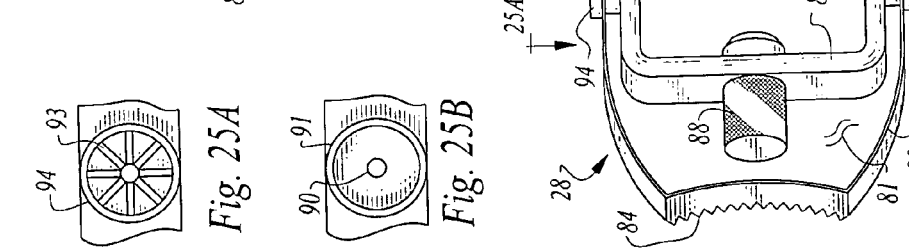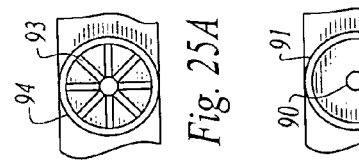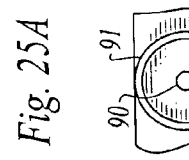

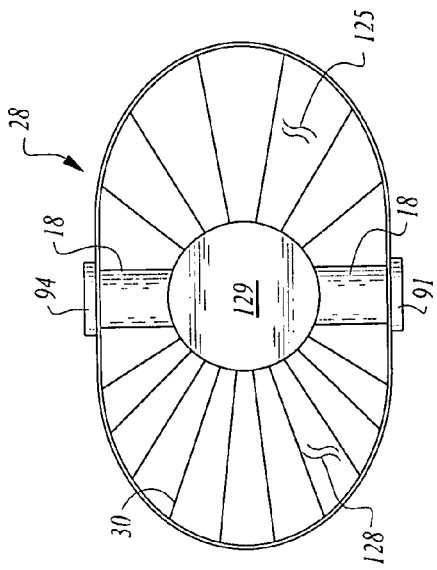
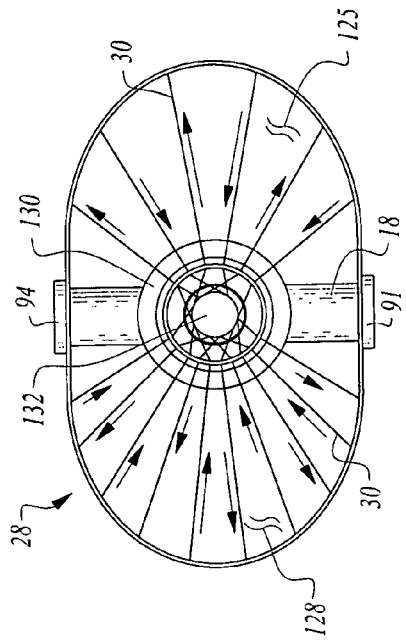
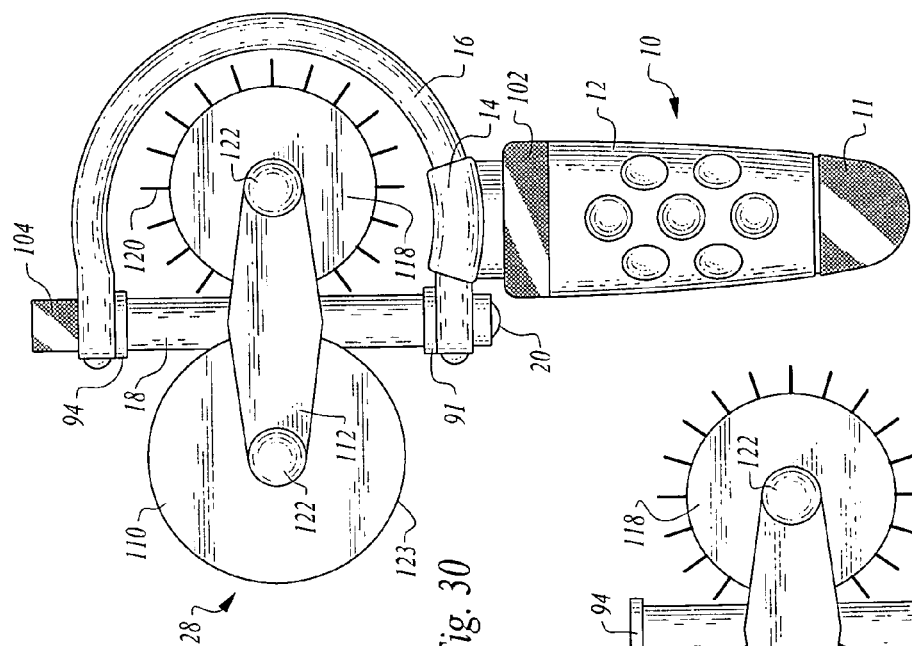
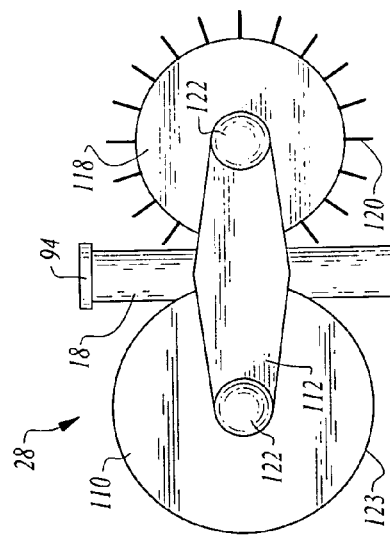

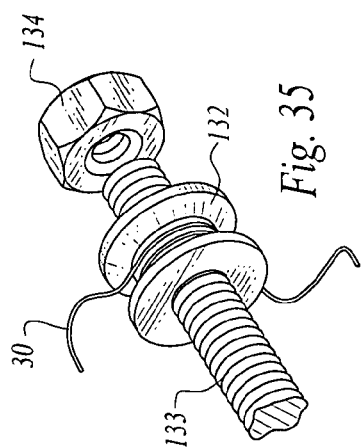
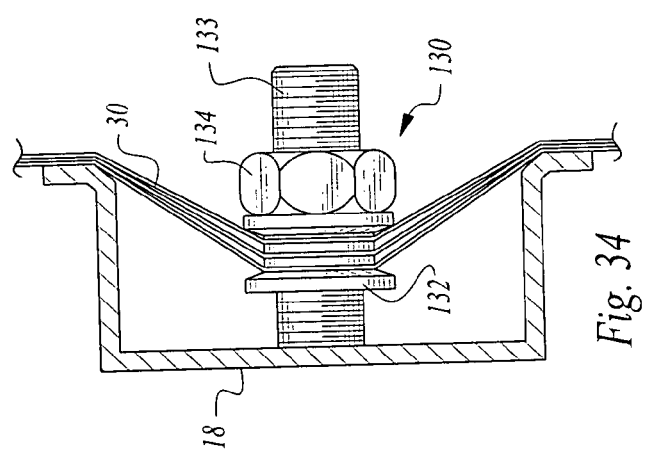
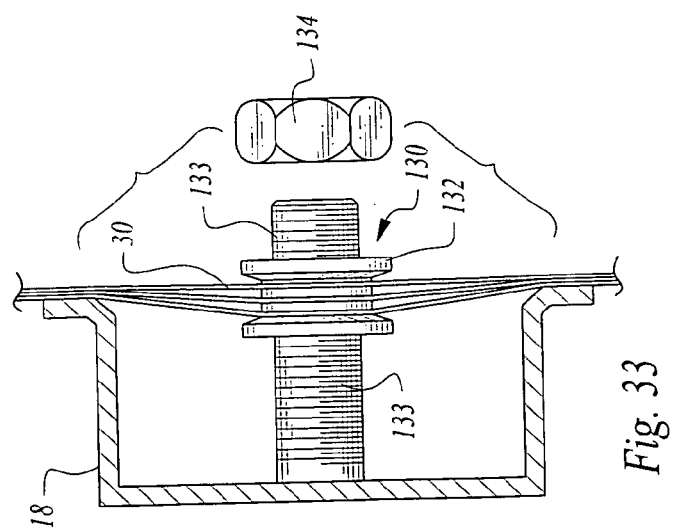

ADJUSTABLE ROTATING BLADE ASSEMBLY FOOD PREPARATION DEVICE

CROSS REFERENCE TO RELATED APPLICATIONS

This patent application is a continuation-in-part of and claims priority from co-pending patent application Ser. No. 13/261,174 filed Feb. 9, 2012, which claims priority from and is a 35 U.S.C. 371 filing of PCT International Patent Application PCT/US2010/02370 filed Aug. 27, 2010, which claims priority from and is a continuation-in-part of U.S. patent application Ser. No. 12/589,683 filed Oct. 27, 2009.

BACKGROUND OF THE INVENTION

Technical Field

This invention relates to devices with rotating blade assemblies, for cutting, shaving, slicing and peeling fruits and vegetables, cheese, tofu, pizza, meat, and other food products, and more particularly to a rotating blade assembly with dual functionalities which are interchangeable with one another and having the adjustable and rotating blade assembly in operable combination with a handle element, where different rotating blade assemblies may be substituted for use with vegetables, fruits, cheeses, tofu, pizza, meat, and the like.

Background Art

Various devices have been proposed and implemented for cutting, peeling, and slicing fruits and vegetables and other food products. Although prior devices have been adapted and used for various purposes in connection with cutting, peeling and slicing fruits and vegetables and other food products, applicant is not aware of any device which allow for dual functions and interchangeability of the cutting and slicing portion of the device to be rotated and adjusted as desired, and then fixed in that position, so as to allow the cutting, peeling and slicing of the or other fruit or vegetables, for example avocado, corn, watermelon, carrots, apples, mango, cheeses, pizza, tofu, bread, meat and the like, to be made at a desired angle by use of an adjustable rotating cutting and slicing assembly.

The present invention provides a device for cutting, peeling and slicing fruits and vegetables and other food products, which is easy to use and operate, and is highly efficient. The device of the present invention has rotating dual functional assemblies with blades, wires and other cutting and peeling elements, and various attachments are interchangeable with one another. The device may also be provided with rotating assemblies for cutting cheese, tofu, breads, peeling carrots and other fruits and vegetables, and shaving and grating blades as well. The device has a handle and a cutting and slicing blade assembly which may be adjusted by rotating the blade element to a desired angle. The rotating blade assembly may then be secured in a desired position for cutting, peeling and slicing operations. This allows the user to cut, peel, slice or core, fruits, vegetables, and other food products at different angles and positions simply by adjusting the blade element in relation to the handle.

Accordingly, the primary object of the present invention is to provide an adjustable dual functional and interchangeable rotating blade assembly cutter, peeler, and slicer which is easy to use for cutting, peeling, shaving or slicing, fruits, vegetables, and other food products such as cheese, pizza, tofu, breads, meats and the like. The rotating blade assembly of the present invention may be easily positioned and secured in different angular positions in relation to the handle, and is very easy to use and efficient in operation. Different rotating blade assemblies may be used with variably spaced cutting blades, wires, and cutting edges, and different rotating blade assemblies may substituted for one anther allowing for a wide variety of cutting capabilities.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF INVENTION

To achieve the foregoing objects, and in accordance with the purpose of the invention as embodied and broadly described herein, a device for cutting, peeling, shaving and slicing fruits, vegetables, and other food products such as avocados, corn, mango, watermelon, cheeses, tofu, pizza, meats and other food products, and is provided having a handle, a frame element connected to the handle, and a rotating blade assembly operably secured to the frame. The rotating blade assembly has one or more cutting elements for cutting, slicing and peeling, and provides a dual functional and interchangeable assembly where a plurality of cutting, slicing and peeling operations are facilitated. The rotating blade assembly is operably secured to the frame by a shaft or pin assembly allowing both movement and positioning of the blade assembly at various angles in relation to the frame.

In another embodiment the rotating blade assembly is secured directly to an end portion of the handle without the use of a separate frame. In this embodiment, one end of handle is configured to receive and position the rotating blade assembly.

BRIEF DESCRIPTION OF DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 13 shows an embodiment of the rotating blade assembly using a tension wire anchor ring and wire tension ring to secure and position the cutting blades or wires, according to the invention.

FIG. 14, shows the wire anchor ring, tension ring, and bolt, securing the cutting blades or wires of the embodiment seen in FIG. 13, according to the invention.

FIG. 15, shows a sectional view of the tension wire anchor ring and tension wire ring of the embodiment seen in FIG. 13, according to the invention.

FIG. 25, shows another embodiment of rotating blade assembly 28, with a "skeletal" type configuration of the rotating blade assembly, according to the invention.

FIG. 25A, shows interchangeable connector 94, with adjustment slots or grooves 93, according to the invention.

FIG. 25B, shows interchangeable connector 91, with central aperture or slot 91, according to the invention FIG. 26, shows the embodiment shown in FIG. 25, operationally secured to the handle and frame element, for dual function of the assembly with interchangeable rotating blade assemblies, according to the invention.

FIG. 27, shows another embodiment of the rotating blade assembly configured as a tofu cutter and slicer assembly, according to the invention.

FIG. 28, shows the embodiment shown in FIG. 27, operationally secured to the handle and frame element, for dual function of the assembly with interchangeable rotating blade assemblies, according to the invention.

FIG. 29, shows another embodiment of the rotating blade assembly where one portion is configured as a pizza or pie cutter roller, and another portion is configured as a meat tender roller, according to the invention.

FIG. 30, shows the embodiment shown in FIG. 29, operationally secured to the handle and frame element, for dual function of the assembly with interchangeable rotating blade assemblies, according to the invention.

FIG. 31, shows another embodiment of the rotating blade assembly where one portion of the cutting blades 30, are configured for cut thick cut portions and the other side configured to cut thin cut portions allowing for dual function of the assembly, and interchangeability with other attachments, according to the invention.

FIG. 32, shows another embodiment of the rotating blade assembly with cutting blades as in FIG. 31, with one side configured for thick cuts and the other side configured for thin cuts with central wire tension attachment 130, according to the invention.

FIG. 33, shows another embodiment of the invention with a wire tension mechanism for securing cutting wires or blades to the rotating blade assembly, according to the invention.

FIG. 34, shows spool for wire or blade attachment of the wire tension mechanism seen in FIG. 33, according to the invention.

FIG. 35, shows the wire tension mechanism of FIG. 33, with nut 134, secured to bolt 133, securing the cutting wires or blades to the rotating blade assembly, according to the invention.

DETAILED DESCRIPTION OF THE PREFERRED EMBODIMENT

Reference will now be made in detail to the present preferred embodiments of the invention as illustrated in the accompanying drawings.

Figure 1:
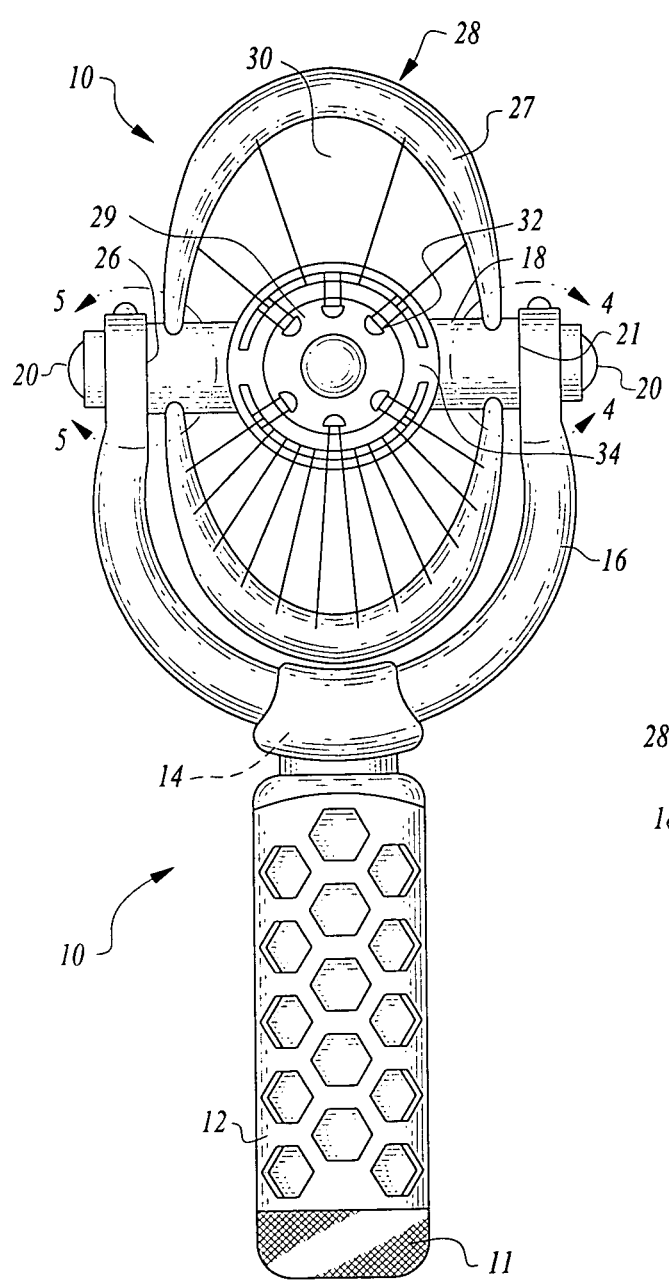
FIG. 1 shows the adjustable rotating blade assembly for cutting, peeling and slicing avocados and other fruits and vegetables, according to the invention.

In accordance with the present invention, as seen in FIG. 1, there is provided in a preferred embodiment of the invention, a device 10, for cutting, peeling, slicing, and shaving, fruits, vegetables, for example avocados, corn, watermelon, apples, carrots, cheeses, tofu, pizza, meats, and the like, and other food products, and having both dual functional and interchangeable assemblies, facilitating a plurality of cutting, slicing and peeling functions having a handle 12, a frame element 16, connected to handle 12, and a rotating blade assembly 28, operably secured to the frame element 16. The rotating blade assembly 28, has one or more cutting elements 30, for cutting, slicing, shaving, and peeling a fruit or vegetable, or other food product. The rotating blade assembly 28, is operably secured to the frame 16, by a shaft or pin assembly 18, allowing both movement and positioning of the blade assembly 28, at various angles in relation to the frame 16. Rotating blade assembly 28, may be easily removed and changed with other rotating blade assembly configurations, as illustrated, for example, in the various figures.

Figure 8:
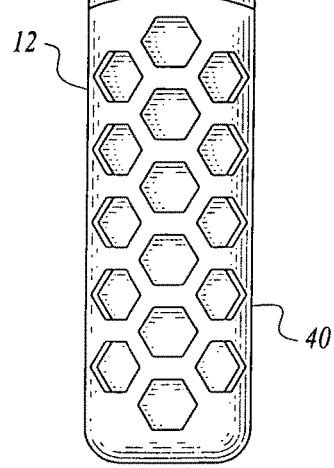
FIG. 8 shows another embodiment of the invention where the handle and frame are configured as one-piece, eliminating a separate frame element, according to the invention.
Figure 20:
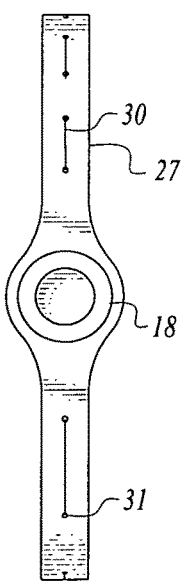
FIG. 20, shows a view of apertures 31, positioned on rotating blade assembly frame 27, used in the embodiment seen in FIG. 13, according to the invention.

In another embodiment the rotating blade assembly 28, is secured directly to an end portion of the handle without the use of a separate frame. In this embodiment, as seen in FIGS. 8 and 20, one end of handle 12, is configured to receive and position the rotating blade assembly.

Figure 3A:
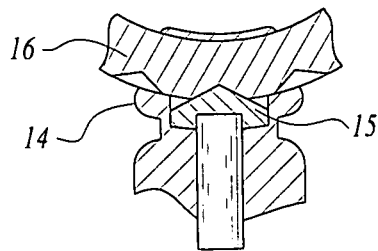
FIG. 3a shows a tri-angulated shaped fastener used to secure the frame element to the handle, according to one embodiment of the invention.
Figure 3:
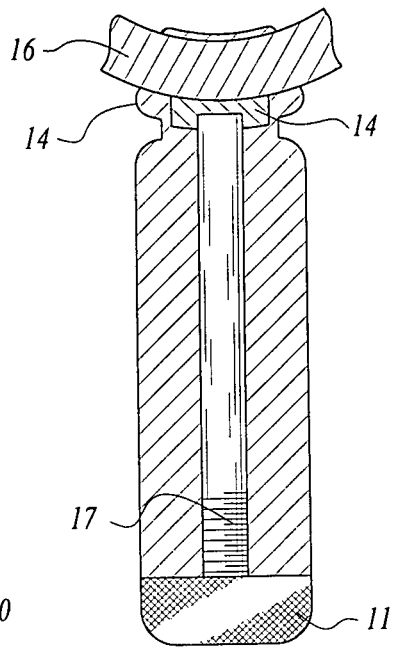
FIG. 3 shows a preferred handle adjustment knob mechanism, according to the invention.

In FIG. 1, a preferred embodiment of device 10, for cutting, peeling, shaving, and slicing fruits, vegetables, and other food products, such as cheese, pizza, tofu, breads, meats and the like, is shown having handle 12, which may be secured to frame element 16, by fastening screw 17, combined with fastener 14, or other fastening mechanisms such as a bolt, nut, flange, key or the like. Both a broadened version of fastener 14 and a triangulated version 15, are illustrated in FIG. 3. Handle 12, may be composed of metal, plastic, wood, or any other durable resilient material. Handle 12, is preferably linked to fastener 15, and may include twist knob 11, allowing for adjustments and tightening of fastener 14, to frame 16. Alternatively, handle 12 may be provided without twist knob 11. In other embodiments, frame element 16, may be eliminated and handle 12, configured as one piece with one end configured to secure and position rotating blade assembly 28.

Rotating blade assembly 28, is preferably operably secured to the frame element 16, by shaft 18, and fasteners 20, which may be fastening bolts, nuts, screws, keys, pins, clamps, or any other fastening device well known in the art. Fasteners 20, may be configured to engage with a tightening assembly with grooved surface 22, on one side, and a end of shaft 18, which may be substantially pointed 24, at one end, and have a second end 26, knobbed. However, this is only one of many configurations contemplated as the functional requirements are to allow shaft 18, to secure cutting blade assembly 28, to frame 16, allowing the rotating blade assembly to be rotated into any position the user desires, and to allow cutting blade assembly 28, to be secured in a desired angular position by fasteners 20. As noted, rotating blade assembly 28, maybe removed from the frame or handle, and changed with other configurations of the rotating blade assembly as desired, allowing for a wide variety of different cutting configurations to be used.

Preferably rotating blade assembly 28, is operably secured to the frame 16, by a shaft or pin assembly 18, allowing both movement and positioning of the blade assembly 28, at various angles in relation to the frame 16. This may be achieved by a wide variety of fastening means, such as fasteners 20, which may be bolts, nuts, screws, keys, clamps, or other fastening, such as spring mechanism 23, means well known in the art.

Rotating blade assembly 28, also referred to herein in different embodiments as rotating cutting assembly and rotating cutting wheel assembly, has one or more cutting elements 30, for cutting, slicing and peeling a fruit or vegetable, such as an avocado. Cutting elements 30, may be provided as wires, blades, or any surface which can cut the fruit or vegetable. The cutting elements may be composed of metal, plastic or other durable resilient material and secured to frame 27, or other surface, by nuts, bolts, screws, adhesives, tension mechanisms or the like. The rotating blade assembly 28, has frame 27, for securing the cutting elements 30, and hub 29, and for positioning and securing cutting elements 30, and shaft 18. Frame 27, may be composed of metal, plastic, wood or any other durable resilient material. The cutting elements 30, may be secured to the hub by fastening knobs 32, or other fastening means well known in the art, such as adhesives, welds, nuts, screws, tightened channels or apertures with mechanical fasteners, or the like.

Figure 2:
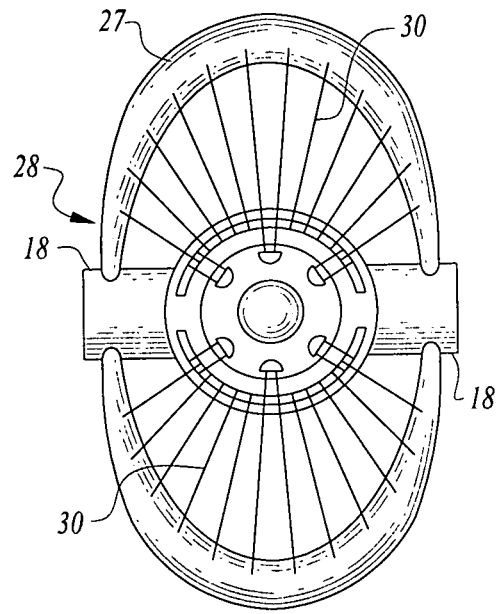
FIG. 2 shows the rotating cutting blade assembly detached from the handle and frame, according to the invention.

With reference to FIG. 2, the rotating blade assembly 28, is shown detached from handle 12. Preferably frame 27, of rotating blade assembly 28, is configured in a curved in an oval or elliptical shape as shown, or frame 27, may be configured as a rectangle with rounded corners, spherical, rectangular in shape or any other chosen configuration. Shaft 18, is shown detached from frame element 16, and in other embodiments may be directly secured to a forked or curved handle. Alternative means of securing frame 27, to either frame element 16, or directly to handle 12, may be by use of a pin, clip, key, axle or the like. The critical functional attribute of any attachment means is that it allows cutting blade assembly 28, to be rotated in various positions, and then secured in a desired position for cutting, peeling or slicing a fruit or vegetable, such as an avocado.

It may be desired, in some embodiments, to have shaft 18, or its functional equivalent extend only partially through cutting blade assembly 28, in which case typically the shaft would be in two parts, or in other embodiments shaft 18 extends all the way through cutting blade assembly 28, as a single shaft. As seen in FIG. 1, a receiving aperture 21, to secure and receive shaft 18, may be positioned in frame element 16, or in alternative embodiments directly in a curved portion of a modified handle.

In FIG. 3, a preferred embodiment of components of twist knob 11, and fastener 14, are shown, where twist knob screw 11, preferably has grooves 17, and engages with fastener 14 securing handle 12, to frame element 16. Of course many other fastening means may be used in alternative embodiments such as a tri-angulated fastener 15, seen in FIG. 3a, or by welding handle 12, to frame element 16, or using clamps, or adhesives, or single piece molds where handle 12, is formed as a single unit with frame element 14, or any other fastening means that securely positions handle 12, in a desired position on frame element 14.

Figure 4:
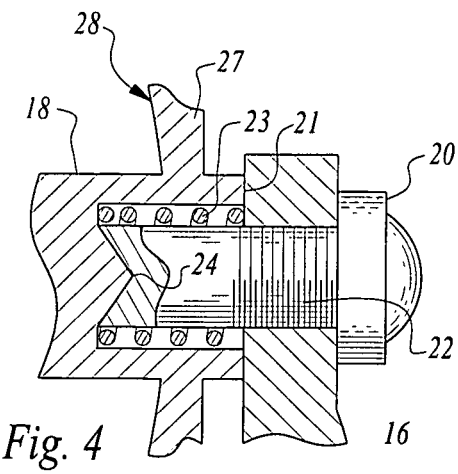
FIG. 4 shows a preferred fastener for the shaft and cutting blade assembly, according to the invention.

With reference to FIG. 4, a preferred embodiment of fastening means 20, is shown, where fastener 20, is combined with a grooved surface 22, allowing for tightening of shaft 18, against frame element 16. In FIG. 3, shaft 18, is shown with a shaft end 24, which may be substantially pointed, or in other embodiments end 24, may be rounded, rectangular, square or any other chosen configuration, for engagement with fastener 20. In other embodiments, grooved surface 22, may be replaced by other tightening mechanisms such as a spring, washer, tightening nut or the like. It is understood that many other type of fastening means and combinations may be used to secure shaft 20, to frame 16, as the functional fastening requirement for operable engagement is to allow rotation of shaft 20, thereby allowing the rotation of cutting blade assembly 28, while allowing the user to secure and position cutting assembly 28, in a desired angular relation to frame 16, and handle 12.

Figure 5:
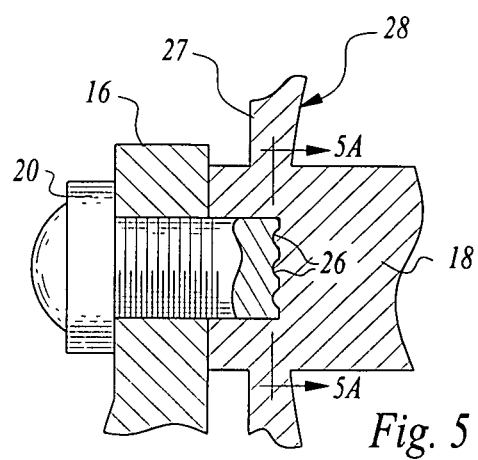
FIG. 5 shows a sectional view of the shaft secured with a fastener, according to the invention.
Figure 5A:
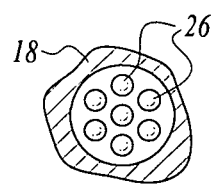
FIG. 5a shows an end of the shaft having knobs 26, according to one embodiment of the invention.

FIG. 5 shows a sectional view of shaft 18, secured to frame element 16, by fastener 20, according to one embodiment of the invention. Cutting blade assembly frame 27, of cutting blade assembly 28 is shown secured thereto. In FIG. 5a, an embodiment of shaft 18, is shown where fastener 20 has a plurality of knobs 26, for fastening to shaft 18. However, as noted above, other fastening means well known in the art may also be used for fastening shaft to cutting blade assembly 28, such as bolts, nuts, screws, keys, clamps, or other fastening mechanisms, such as spring mechanism 23, well known in the art.

Figure 6:
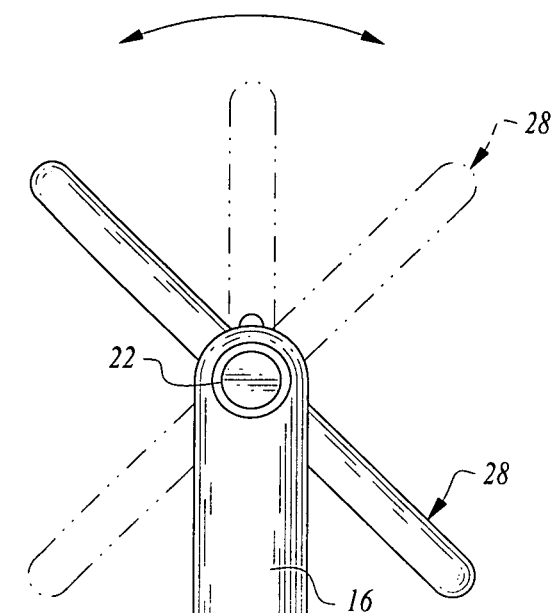
FIG. 6 shows the rotating cutting blade assembly positioned at a selected angle in relation to the frame and handle, according to the invention.
Figure 6:
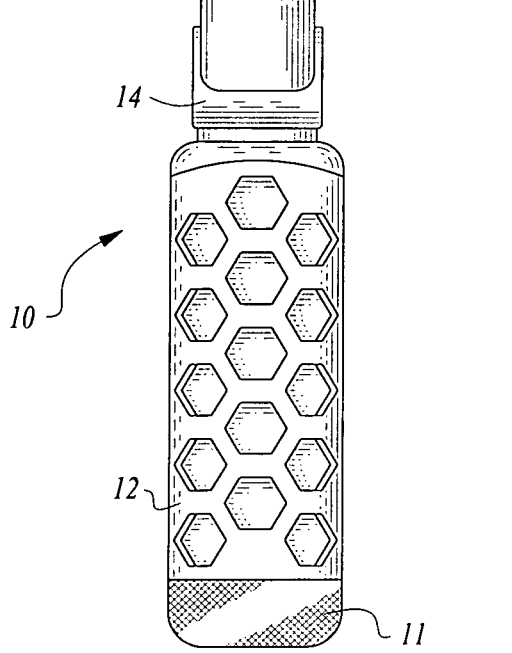

Referring now to FIG. 6, the cutting, peeling and slicing device 10, for cutting, peeling and slicing avocados and other fruits and vegetables is shown with rotating cutting blade assembly 28, shown in a different cutting angle than that shown in FIG. 1. It is noted, that rotating cutting blade assembly or rotating cutting wheel assembly 28, may be rotated and fixed at any selected angle for cutting, peeling or slicing the fruit or vegetable.

Figure 7:
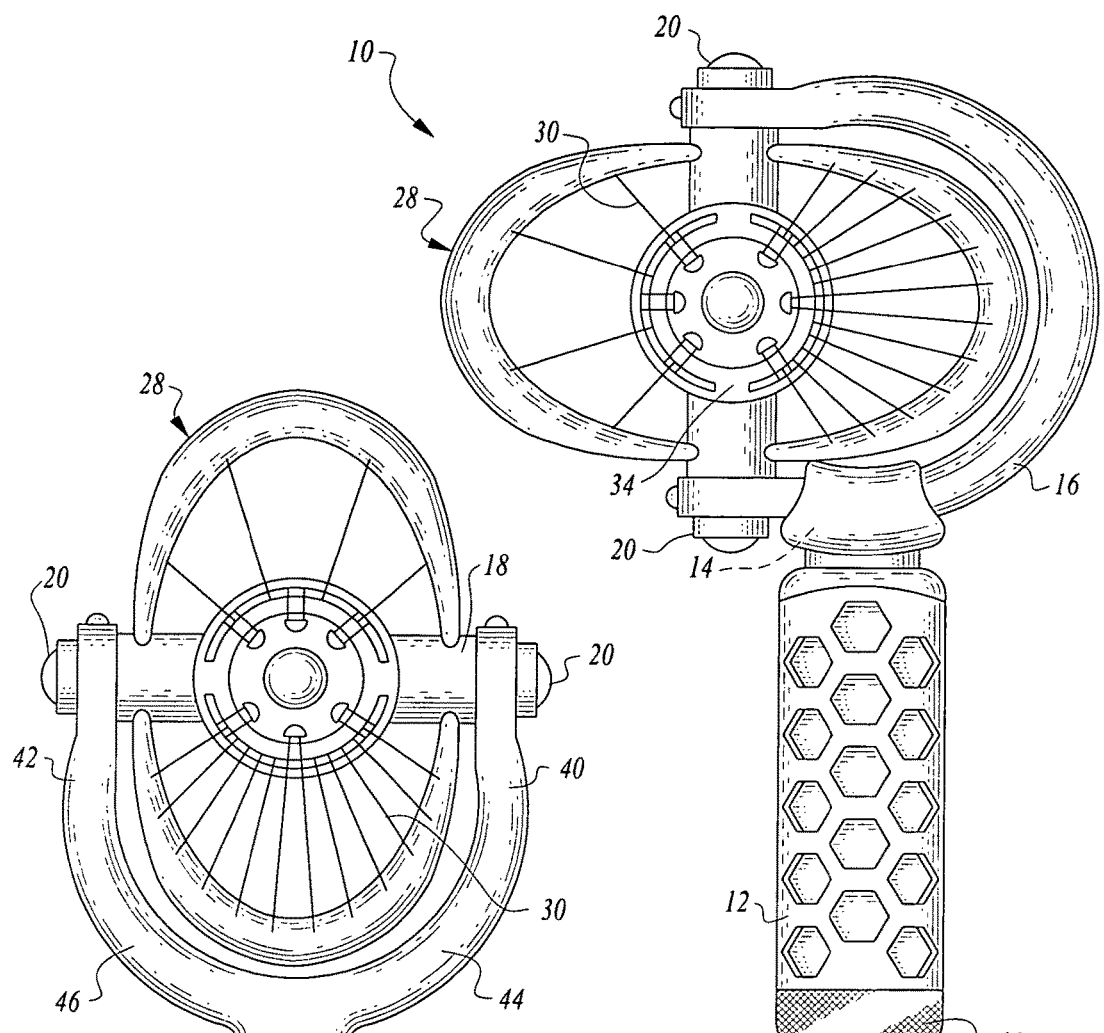
FIG. 7 shows the rotating blade assembly for cutting, peeling and slicing avocados and other fruits and vegetables, illustrating how handle 12, may be moved and positioned on frame 16, as desired, according to the invention.

In FIG. 7, device 10, for cutting, peeling and slicing avocados and other fruits and vegetables is shown having handle 12, moved on frame element 16, to a different position as that shown in FIG. 1. Again, handle 12, which may be secured to frame element 16, by fastening screw with grooves 17, combined with fastener 14, or other fastening mechanisms such as a bolt, nut, flange, key or the like, is easily repositioned on frame element 16, if the user desires to cut, peel or slice with cutting assembly 28, in a different position. Accordingly, it is seen that both cutting assembly 28 may be rotated and positioned in relation to handle 12, as seen in FIG. 6, and that handle 12, may be positioned at different places on frame 16.

In another preferred embodiment, as seen in FIG. 8, handle 12, is configured having an elongated first end 40, configured to be held in a human hand, and a second end 42, having two arms, 44, and 46, in between which is positioned cutting blade assembly 28. Arms 44, and 46, may form a substantially U-shaped space as shown in FIG. 6, or be spaced and configured differently, for example, be formed parallel to one another, or rounded, or any other configuration, the functional goal of any configuration however, is to allow the rotation of cutting blade assembly 28, to rotate freely therein, and to allow positioning of cutting blade assembly 28, by fastener 20, either being loosened or tightened against shaft 18. Although this embodiment is functionally equivalent to the embodiment illustrated in FIG. 1, in this embodiment frame element 16, is eliminated and handle 12, is configured and formed with arms 42 and 44.

Figure 9:
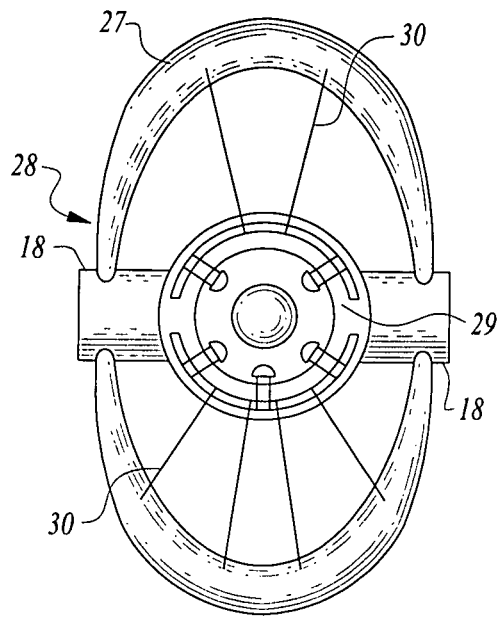
FIG. 9 shows an embodiment of rotating blade assembly with blades spaced differently on the top and bottom portions of the assembly, according to the invention.
Figure 10:
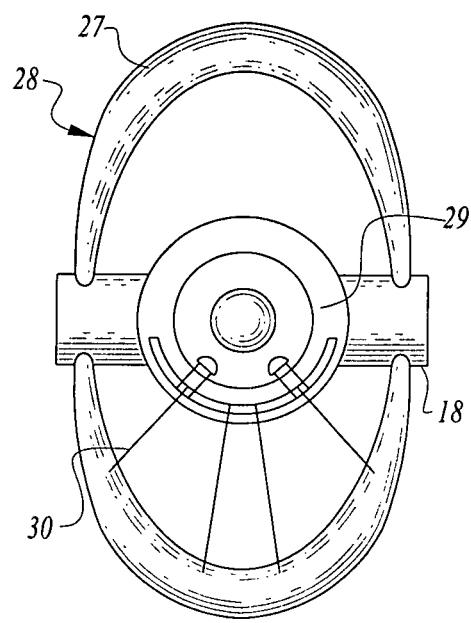
FIG. 10 shows an embodiment of rotating blade assembly with blades placed in one portion of the assembly while another portion does not have blades, according to the invention.

FIGS. 9-12, show various embodiments of rotating blade assembly 28. In FIG. 9, an embodiment of rotating blade assembly 28, has blades 30, spaced differently on the top and bottom portions of the assembly. This allows for different sized cuts depending upon how the rotating blades assembly 28 is rotated or positioned With reference now to FIG. 10, an embodiment of rotating blade assembly 28, is shown with blades placed in one portion of the assembly while another portion does not have blades. Again, this allows for variation in cuts and slices depending upon the rotation and positioning of rotating blade assembly 28.

Figure 11:
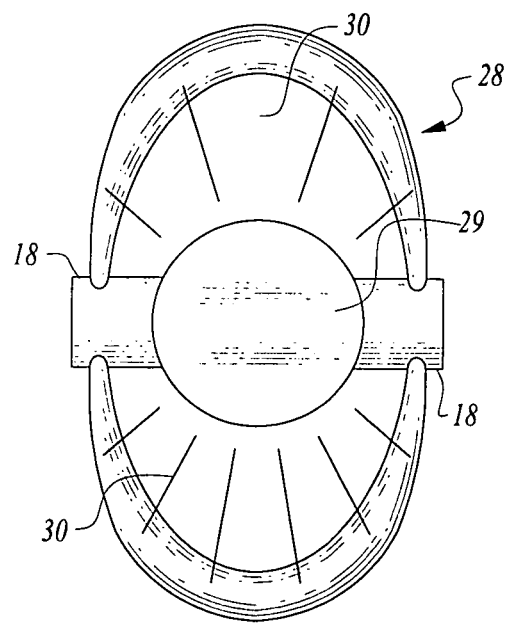
FIG. 11 shows an embodiment of rotating blade assembly with blades which are only secured to frame 27, and not to the central portion of the assembly, according to the invention.

In FIG. 11, an embodiment of rotating blade assembly 28, is shown where cutting blades 30, are only secured to frame 27, and not to the central portion of the assembly, according to another embodiment of the invention. Preferably in this embodiment, the cutting blades are composed of a plastic, but as noted previously, other durable resilient materials may be used.

Figure 12:
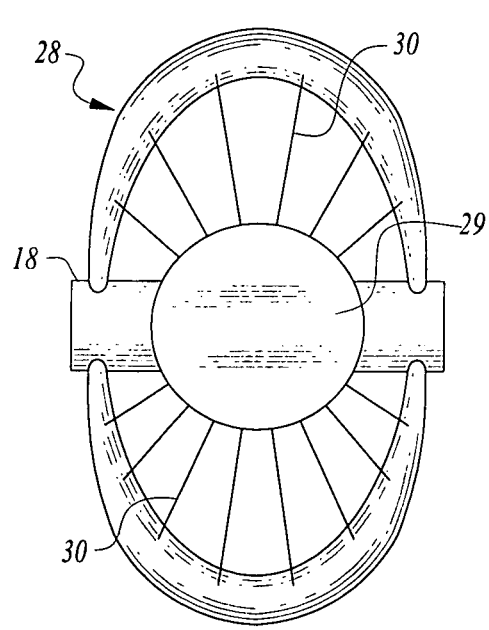
FIG. 12 shows an embodiment of rotating blade assembly with blades secured to a solid central hub, according to the invention.

Referring now to FIG. 12, shows an embodiment of rotating blade assembly 28, with cutting blades 30, secured to a solid central hub 29, according to the invention.

FIGS. 13-20, illustrate another preferred embodiment of the invention where a wire tension ring is used to secure cutting blades 30, to rotating blade assembly 28. In this embodiment, a bolt holds a wire anchor ring 52 and wire tension ring in place positioning and securing cutting blades 20, to rotating blade assembly 28. In FIG. 13, handle 12 has arms 44 and 46, to position and secure rotating blade assembly 28, however, in alternative embodiments a separate frame may be secured to handle 12, to position and secure rotating blade assembly 28.

With reference now to FIG. 14, details for the tension ring mechanism shown is FIG. 13 is detailed. Cutting blades or wires 30, are secured in place by a wire anchor ring 52 operably secured to nut or bolt 50 and operably linked to wire tension ring 54. This mechanism may be pushed into place by a hex nut or bolt 50, and cutting blades or wires 30, may be further secured by adhesives to the rotating blade assembly.

In FIG. 15, further details the tension ring system for attaching cutting blades or wires 30. Bolt or hex nut 50, is seen securing wire anchor ring 52, and tension ring 54, with aperture 56, to hold and secure cutting blades or wires 30. Preferably the edges of the wire tension ring 54, which come in contact with cutting blades or wires 30, are rounded to prevent breakage.

Figure 18:
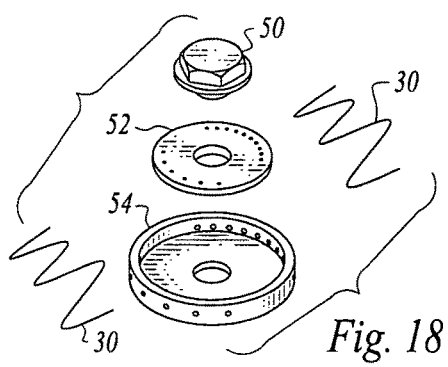
FIG. 18, shows a preferred embodiment of wire tension ring 54, used in the embodiment seen in FIG. 13, according to the invention.
Figure 17:
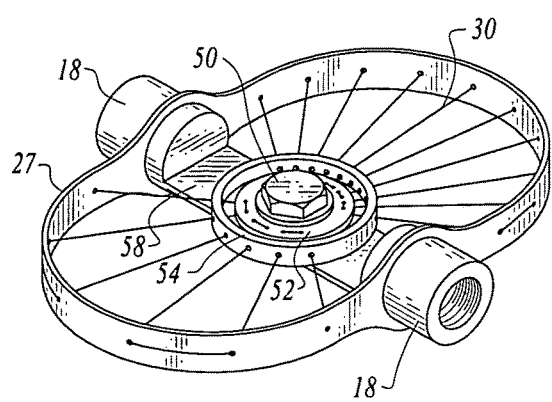
FIG. 17, shows a preferred embodiment of shaft 18, used in the embodiment seen in FIG. 13, according to the invention.
Figure 16:
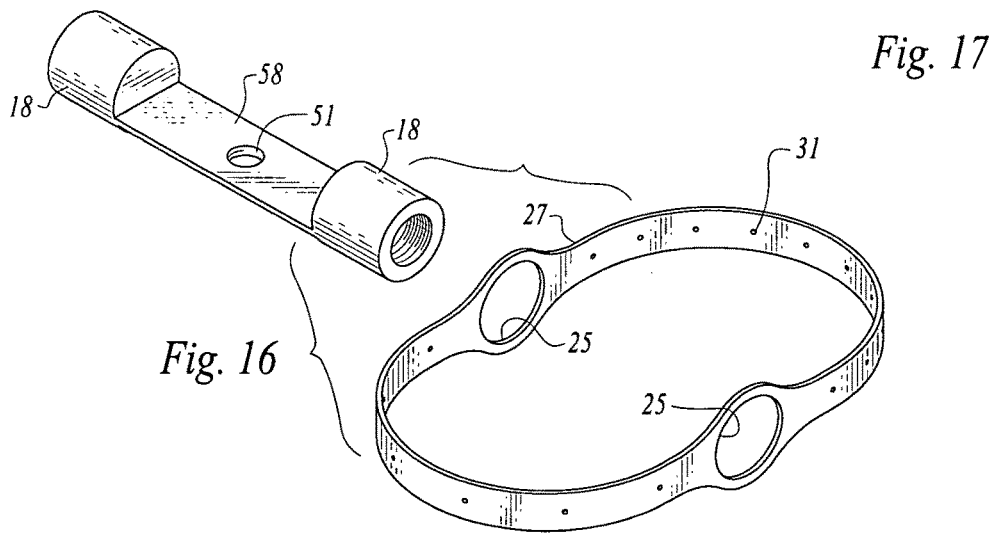
FIG. 16, shows the cutting blade assembly frame without blades or cutting wires with shaft 18, of the embodiment seen in FIG. 13, according to the invention.

Referring now to FIG. 16, frame 27, is shown as a one-piece unit with apertures 25, to receive shaft 28, in this embodiment with notch or groove 58, with aperture 51, for bolt or hex nut 50, or other fastening mechanism, such as a screw, key, shaft or the like, and smaller apertures 31, for receiving cutting blades or wires 30. FIG. 17, shows shaft 18, for positioning of the wire anchor ring 52, and wire tension ring 54. Preferably, wire tension ring 54, is fixed to the notch or groove area 58, of shaft 18, best seen in FIG. 16. FIG. 18, shows the wire tension ring 54, with wire anchor ring 52, and bolt or hex nut 50, or other fastening means such as screws, shaft, key, adhesive or the like may be alternatively used.

Figure 19:
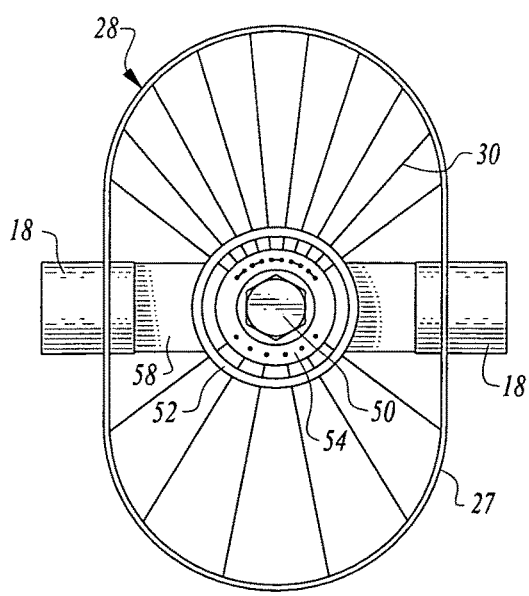
FIG. 19, shows a preferred embodiment of rotating blade assembly 28, used in the embodiment seen in FIG. 13, according to the invention.

In FIG. 19, rotating blade assembly 28, is shown detached from handle 12. In this embodiment, wire tension ring 54, is used with hex nut or bolt 50, to secure wires in place in the rotating cutting blade assembly. It is seen in that cutting blades or wires 30 are spaced differently on the different sides of shaft 18, allowing for different thickness of slices and cuts. As with the other rotating blade configurations disclosed herein, any rotating blade assembly 28, may be easily removed from the handle 12, and replaced with a differently configured rotating blade assembly, allowing for a wide variety of cutting, peeling, and slicing capabilities.

In FIG. 20, apertures 31, are shown for cutting blades or wires 30, as well as how the positioning of shaft 18, on cutting blades assembly frame 27, is preferably configured. Of course, various sized apertures may be needed depending upon the size and shape or the cutting blade or wire used, and the spacing of aperture 31, chosen to space the cutting blades and wires 30 as desired.

Figure 21:
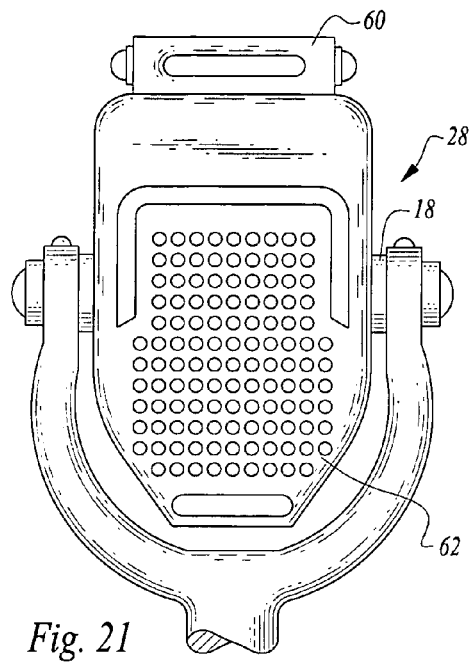
FIG. 21, shows a rotating blade assembly with the blade configured as a peeling blade for carrots, potatoes, and the like, and another portion configured as a grating surface, according to the invention.

In FIG. 21, a rotating blade assembly is shown with the blade, preferably a double blade 60, configured as a peeling blade, for carrots, potatoes, and the like, and another portion configured as a grating surface 62, according to the invention. In this embodiment, as well as in all other shown herein, the rotating blade assembly is preferably composed of a durable resilient material such as a metal, composite, plastic, treated-wood or the like.

Figure 22:
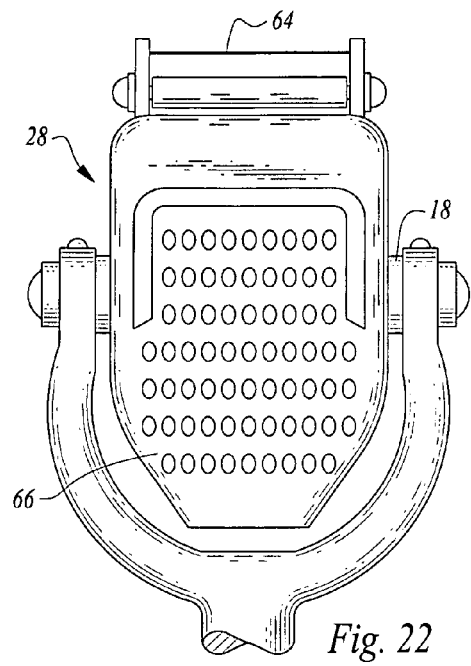
FIG. 22, shows a rotating blade assembly with the blade configured as a cheese cutting wire or blade, and another portion configured as a grating surface, according to the invention.

Another embodiment seen in FIG. 22, shows a rotating blade assembly with the blade configured as a cheese cutting wire or blade 64, and another portion configured as a grating surface 66, according to the invention. Of course this embodiment may be used for cutting or slicing various cheese, tofu, bread, meat and other food products.

Figure 23:
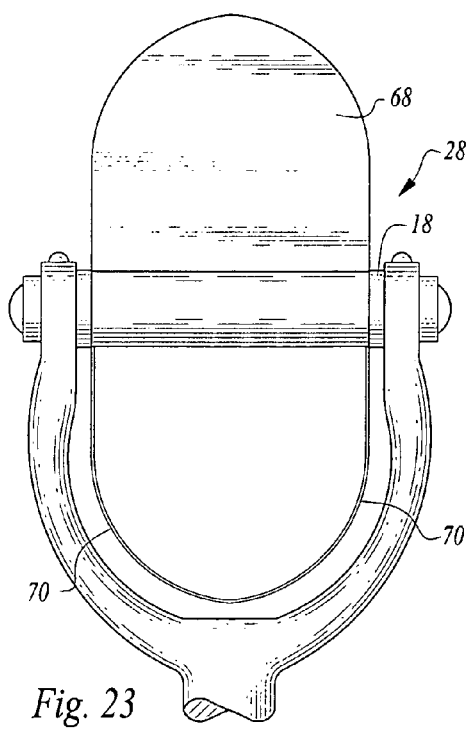
FIG. 23, shows a rotating blade assembly with the blade configured as one solid plate with another portion configured as a scoop, according to the invention.

In FIG. 23, a rotating blade assembly in shown in an embodiment with the blade configured as a solid plate or blade 68, with another portion configured as a scoop 70, preferably as shown, as a hollow scoop, according to the invention. The plate or blade 68, may be used to cut, peel, vegetables, fruits, cheese, tofu, bread, and other food products and can be configured in various sizes, with hollow scoop 70 used to scoop, cut or peel fruits and vegetables or other food products as desired.

Figure 24:
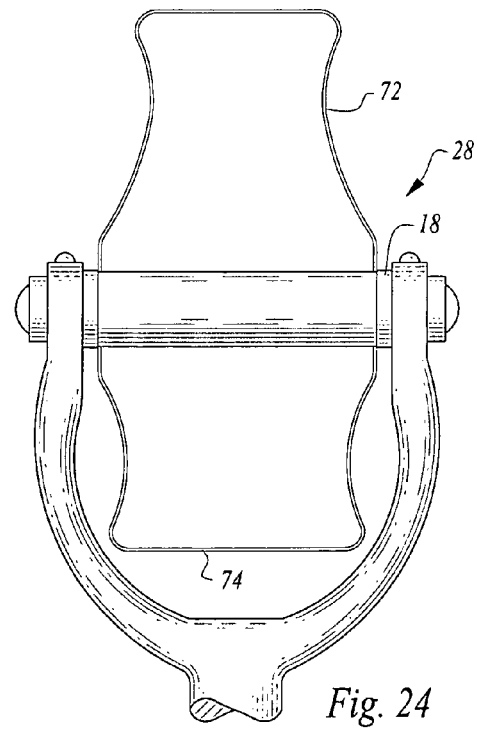
FIG. 24, shows another embodiment of the rotating blade assembly where one portion is configured as a large scoop and another portion is configured as a smaller scoop, according to the invention.

FIG. 24, shows another embodiment of the rotating blade assembly 28, where one portion is configured as a large scoop 74, and another portion is configured as a smaller scoop 72, according to the invention. Large scoop 74, may be used, for example for peeling or cutting apples or melons, and the small scoop 72, used on smaller fruits and vegetables such as strawberries.

In FIG. 25, another embodiment of the rotating blade assembly 28, is shown with edge 80, defining space portion 81, and is preferably configured as a corn cutter or husker, cutter with preferably a small saw-tooth type cutting edge 84. Another edge 83, defines space portion 85, and is preferably configured as coner or cutter for fruits and vegetables or for use with small vegetables/fruits, with a larger saw-tooth type cutter 82, as shown. In this embodiment, preferably shaft 86, is configured substantially u-shaped or otherwise bent as desired, and having adjustable knob 88, for tightening and positioning the shaft on frame 16, as seen in FIG. 26. Shaft 86 is secured to frame 16, by fastening means such as interchangeable connector 91 with adjustment center 90, which may be an aperture or gap, and interchangeable connector 94, preferably with adjustment slots or grooves 93. Connectors 91 and 94 may be nuts, clamps, clasps, or other connecting and fastening means. Of course, other fastening means may be substituted for interchangeable connectors 91, and 94 such as fastening rings, fasteners, or clips. In this embodiment, edge 80, and 83, define a "skeletal" type configuration of rotating blade assembly 28.

In FIG. 25A, a detailed view of interchangeable connector 94, is shown as a sectional view, with adjustment slot or groove 93, allowing for positioning and adjustment of the rotating blade assembly at any angle or position desired for cutting, slicing, grating, coning and other food preparation operations.

In FIG. 25B, a detailed view of interchangeable connector 91, is shown as a sectional view, with adjustment aperture or slot 90, allowing for positioning and adjustment of the rotating blade assembly at any angle or position desired for cutting, slicing, grating, coning and other food preparation operations.

With reference now to FIG. 26, shows the embodiment shown in FIG. 25, operationally secured to handle 12, and frame element 16, allowing for dual function of the assembly with the interchangeable rotating blade assembly 28, as described above for FIG. 25. A left-right adjustment and tightening ring 102, is operably positioned on handle 12, for tightening and positioning of frame 16. Adjustment and tightening ring 102, may be composed of a metal, composite, plastic or the like, and may be rotatably attached to handle 12 by grooves, slot, or other mechanism well known in the art. In FIG. 26, edge 80, defining space portion 81, and is preferably configured as a corn cutter or husker, cutter with small saw-tooth type cutting edge 84. Another edge 83 defines space portion 85, and is preferably configured to cut cone shaped cuts, or a cutter for small fruits and vegetables husker or for use with other vegetables/fruits, with larger saw-tooth type cutter 82, as shown. In this embodiment, preferably shaft 86, is configured substantially u-shaped or otherwise bent as desired, and having adjustable knob 88, for tightening and positioning the shaft on frame 16. In this embodiment the rotating blade assembly with edges 80, and 83, defines a skeletal type configuration for cutting and coning fruits, vegetables, and any other food product chosen. Also shown are fastening nut or clasp 20, with adjustment knob or nut 104, positioned to secure the assembly on the opposite side of frame 16. Shaft 86, is secured to frame 16, by fastening means such as interchangeable connectors 91, with adjustment center 90, and 94, preferably with adjustment slots or grooves 93, best seen in FIGS. 25A and 25B, with a protective washer being optional, fastening nut or clasp 20, and adjustable knob or nut 104. Of course, other fastening means may be substituted for interchangeable connectors 91, and 94, such as fastening rings, clamps, or clips, or the like.

FIG. 27, shows another embodiment of the rotating blade assembly configured as a tofu cutter and slicer with a substantially flat, solid planar blade surface 96, with edge 98, secured to shaft 18, and the like, and another portion 100, configured as a tofu cutter blade 100, which may have measurement lines or indicia 95, accurately gauge the depth of the cut or slice. Space 97, which is empty has tofu cutter and slicer blade 100, defining its edges. Shaft 18, is secured to the tofu cutter and slicer by interchangeable connector 91, with adjustment center 90, and interchangeable connectors 94, with adjustment slots or grooves 93, best seen in FIGS. 25A and 25B. It is seen in this embodiment how one part of the rotating blade assembly is provided as a solid planar blade surface 96, and the other portion is provided as a cutter blade 100, with space 97. Of course, many other configurations using this multiple or dual functional rotating blade assembly may be provided with one portion being a solid cutting blade and the other a cutter with a hollow interior or space, this being a representative example of a preferred configuration for tofu cutting and slicing.

In FIG. 28, the embodiment shown in FIG. 27, is shown attached to handle 12, with adjustment ring 102, and frame 16. for dual function of the assembly with interchangeable rotating blade assembly operably secured to handle 12. substantially flat, solid planar blade surface 96, with edge 98, secured to shaft 18, and the like, and another portion 100, configured as a tofu cutter blade 100, which may have measurement lines or indicia 95, accurately gauge the depth of the cut or slice. Space 97, which is empty has tofu cutter and slicer blade 100, defining its edges. Shaft 18, is secured to the tofu cutter and slicer by interchangeable connector 91, with adjustment center 90, and interchangeable connectors 94, with adjustment slots or grooves 93, best seen in FIGS. 25A and 25B, or other interchangeable fastening, attachment, and positioning means may be substituted such as nuts, clasps, clips, or other fastening mechanisms well known in the art, and tightened to frame element 16, by tightening knob or nut 104, and fastening nut 20. In FIGS. 27 and 28, preferably solid planar blade surface 96, with edge 98, and tofu cutter blade 100, are preferably composed of a durable resilient material such as stainless steel or plastic.

In FIG. 29, another embodiment of the rotating blade assembly is shown where two circular rotating elements 110 and 118, are linked via connecting element 112 secured to shaft 18, which may be fastened by mechanical means such as nuts, clasps, bolts, adhesives or the like, or may be provided integral therewith. Circular rotating elements 110, and 118, are preferably secured to connecting element 112, by nut 122, or other fastening means such as clasps, fastening rings, bolts, clips or the like. Preferably one of the circular rotating elements is sized larger than the other, in this example in FIG. 29, circular rotating element 110, is larger than circular rotating element 118. In FIG. 29, circular rotating element 110, may have sharpened edge 123, and may be used, for example, as a pizza or pie cutter. Circular rotating element 118, is shown provided with spikes 120, or cutting elements, for use, for example, as a meat tender roller.

FIG. 30, shows the embodiment shown in FIG. 29, operationally secured to the handle 12, with twist knob screw 11, and frame element 16, and adjustment ring 102, for dual function of the assembly with interchangeable rotating blade assembly having circular rotating elements 110, and 118. By use of adjustment knob or nut 104, and adjustable interchangeable connectors 91, and 94, best seen in FIGS. 25A and 25B, the circular rotating elements may be positioned and secured at any angle in relation to shaft 18. As with all of the different embodiments described, the rotating blade assembly provides dual or multi-functional capabilities and each is interchangeable with different rotating blade assemblies. In this way a truly multi-functional and very versatile cutting, peeling, slicing, grinding, tenderizing and shaving, device is provided for food preparation of fruits, vegetables, cheese, tofu, bread, meats, pizza, pie and all other types of food.

In FIG. 31, another embodiment of the rotating blade assembly is shown where one portion of the cutting blades 30, are spaced, with large space 125, and configured for cut thick cut portions, and the other side, spaced with small space 128, configured to cut thin cut portions, allowing for dual function of the assembly, and interchangeability with other attachments. Cutting blades 30, are preferably composed of a durable resilient material such as plastic or stainless steel or other metal. In this embodiment a central cutting element tension attachment mechanism 129, is preferably utilized.

With reference now to FIG. 32, shows an embodiment of the rotating blade assembly with cutting wires or blades 30, are spaced, with large space 125, and configured for cut thick cut portions, and the other side, spaced with small space 128, configured to cut thin cut portions, allowing for dual function of the assembly, and interchangeability with other attachments. In this embodiment a central wire or cutting element tension attachment mechanism 130, is utilized with one side configured for thick cuts and the other side configured for thin cuts with central wire tension attachment 130, with moveable spool 132, for attachment of cutting wires or blades 30, and shown in more detail in FIG. 33, FIG. 34, and FIG. 35.

In FIG. 33, shows a more detailed view of wire tension attachment mechanism 130, for securing cutting wires or blades 30, to the rotating blade assembly. Bolt or rod 133, is secured to shaft 18, by nut 134, and is adapted to receive spool 132, to which cutting wires or blades 30, are secured, better seen in FIG. 34.

FIG. 34, shows spool 132, for cutting wire or blade 30, attachment of the wire tension mechanism seen in FIG. 33. Preferably the cutting wires or blade 30 are secured as seen by winding or wrapping, or otherwise securing a portion around moveable spool 132. When wire tension mechanism is depressed thereby moving spool 132 down bolt or rod 133, wire or cutting elements 30 are secured and positioned in place.

In FIG. 35, shows the wire tension mechanism 130, of FIG. 33, and FIG. 34, with nut 134, operably secured to bolt 133, for holding and positioning spool 132, in a desired position thereby securing and positioning the cutting wires or blades 30, in a desired position and orientation on the rotating blade assembly.

In operation and use, adjustable rotating blade assembly 10, for cutting, peeling, shaving or slicing, for example, food products, for example fruits and vegetables such as avocados, corn, watermelon, mango, carrots, apples, or other food products such as cheese, tofu, bread, pizza, meats, and the like, is very easy to use, efficient, and reliable, and provides dual functional and interchangeable assemblies while providing a plurality of cutting, peeling, and slicing functions. Adjustable rotating cutting blade assembly 10, may be used for cutting, peeling slicing, or coning fruits and vegetables, and other food products such as cheese, tofu, bread, pizza, meats, and the like, and is inexpensive to manufacture and easy to use. Adjustable rotating blade assembly 10, may be provided in a wide variety of different sizes and configurations. Further, different rotating blade assemblies may be used and substituted on the handle. This allows the user to have a wide range of cutting, peeling, slicing, and coning options. Additionally, as seen in the FIGS. 1,2,7,8,13,17, and 19, 31 and 32 the spacing and number of the cutting blades or wires in the rotating blade assembly preferably differ, but alternatively may be equal, on the upper portion from the lower portion, that is, either more or less blades and wires are typically provided on one portion allowing for each rotating blade assembly to provide different size slices and cuts. As seen in FIGS. 21 to 24 various blades, grating surfaces, hollow scoops, and other type surfaces and configurations may be provided for shaving, cutting, peeling, coring, coning, slicing, and other food preparation procedures. Or other examples of embodiments are seen in FIGS. 25, 26, 27, 28, 29, 30, 31, and 32. The rotating blade assembly of the present invention provides dual or multiple functional aspects in each assembly and the different assemblies are interchangeable as desired.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:
1. A food preparation preparation device for cutting, shaving, slicing, peeling, and coning fruits, vegetables, cheeses, tofu, breads, and meats, comprising:
   a handle;
   a frame element connected to said handle; and
   a rotating blade assembly operably secured to said frame element having dual or multi-functional food preparation capabilities and interchangeable with other rotating blade assemblies; said rotating blade assembly includes a shaft for operable engagement with said frame element, and the rotating blade assembly having a plurality of cutting elements for cutting, shaving, slicing and peeling said fruits, vegetables, cheeses, tofu, breads, and meats, wherein said rotating blade assembly includes a tension attachment mechanism for securing cutting wires, or blades to the rotating blade assembly, said tension attachment mechanism includes a moveable spool, and allowing for adjustable positioning of the rotating blade assembly into any chosen position and then to be secured in that position on the shaft.

* * * * *